US012334044B2

(12) United States Patent
Sanlikol

(10) Patent No.: US 12,334,044 B2
(45) Date of Patent: Jun. 17, 2025

(54) DIGITAL KEYBOARD INSTRUMENT WITH ACCESS TO MICROTONAL NOTES

(71) Applicant: Mehmet Ali Sanlikol, Belmont, MA (US)

(72) Inventor: Mehmet Ali Sanlikol, Belmont, MA (US)

(*) Notice: Subject to any disclaimer, the term of this patent is extended or adjusted under 35 U.S.C. 154(b) by 186 days.

(21) Appl. No.: 18/126,854

(22) Filed: Mar. 27, 2023

(65) Prior Publication Data

US 2023/0306940 A1 Sep. 28, 2023

Related U.S. Application Data

(60) Provisional application No. 63/323,600, filed on Mar. 25, 2022.

(51) Int. Cl.
*G10H 1/34* (2006.01)

(52) U.S. Cl.
CPC ......... *G10H 1/34* (2013.01); *G10H 2240/021* (2013.01)

(58) Field of Classification Search
CPC ........................... G10H 1/34; G10H 2240/021
See application file for complete search history.

(56) References Cited

U.S. PATENT DOCUMENTS

| | | | | |
|---|---|---|---|---|
| 3,141,371 A * | 7/1964 | Coles | G10C 3/12 84/448 |
| 3,865,004 A * | 2/1975 | Coles | G09B 15/08 84/451 |
| 4,054,079 A * | 10/1977 | Sohler | G10C 3/12 84/427 |
| 4,903,572 A * | 2/1990 | Coles | G10H 1/0008 84/453 |
| 5,404,788 A * | 4/1995 | Frix | G10C 3/12 84/424 |
| 6,194,646 B1 * | 2/2001 | Kowalski | G10C 3/12 84/427 |
| 6,229,082 B1 * | 5/2001 | Masias | G10H 1/0066 84/645 |
| 2003/0015087 A1 * | 1/2003 | Haken | G10H 1/0555 84/658 |
| 2021/0056941 A1 * | 2/2021 | Chang | G10H 1/0066 |
| 2023/0306940 A1 * | 9/2023 | Sanlikol | G10H 1/34 |

* cited by examiner

*Primary Examiner* — Robert W Horn
(74) *Attorney, Agent, or Firm* — Giordano Law LLC; David A. Giordano

(57) ABSTRACT

The disclosure provides a digital keyboard instrument with seventeen keys per octave. Sharp and flat keys are split to produce additional microtonal notes on the upper end of each sharp or flat key while maintaining a traditional keyboard aesthetic. In some configurations, the digital keyboard instrument is configured to produce twenty two notes from the seventeen key octave. This digital keyboard instrument is configured to provide opportunities to musicians to perform a variety of microtonal music with a keyboard that provides ease of use with practical fingering placement.

17 Claims, 2 Drawing Sheets

DIGITAL KEYBOARD INSTRUMENT WITH ACCESS TO MICROTONAL NOTES

PRIORITY

This application claims priority to U.S. Provisional Application No. 63/323,600, filed Mar. 25, 2022. The entire contents of that application are incorporated herein.

FIELD

This disclosure relates to the field of music, and specifically, in the field of digital keyboard technology.

BACKGROUND

In the area of musical instrument tuning, the current tuning model, commonly known as equal temperament, provides an octave divided into twelve equal steps wherein all notes are equidistant. However, fundamental acoustical principles based on the overtone series comprise pitches in a given scale that are not equally distanced from each other. Pitches that are not equally distanced from each other are referred to as "microtonal" notes. In certain parts of the world, such as the Middle East, unequally distanced microtonal notes are still used in music. Music including microtonal notes is growing in popularity in the Western world as well. However, these microtonal notes cannot be played on traditional musical instruments such as a guitar with fixed frets, a piano with twelve keys per octave, or other similar keyboard instruments due to the absence of keys to represent such microtonal notes. Furthermore, recent attempts to add additional keys to represent microtonal notes on keyboard instruments have resulted in overly complex instruments that are extremely difficult to play with keys that present impractical fingerings.

In view of the foregoing, there is a need for a keyboard instrument that provides access to microtonal notes to enable musicians to play an expanded repertoire of music with microtonal qualities. In addition, there is a need for a keyboard instrument that provides easy access to microtonal notes that is implemented in a digital device to provide performance in modern digital settings.

SUMMARY

In one aspect, this disclosure provides a digital keyboard instrument comprising: a body; a processing unit arranged within the body and comprising one or more microcontrollers; and a plurality of total key sets, wherein each total key set comprises: seventeen total keys per octave, wherein the seventeen total keys comprise twelve octave keys and five additional keys, wherein each of the five additional keys is a split flat key or split sharp key, and wherein each microcontroller is configured to send a music signal to a computer when actuated by a key.

In some embodiments, the total key set is configured to produce seventeen pitches. In some embodiments, from 5 to 17 keys are configured to produce microtonal pitches. In some embodiments, the total key set is configured to produce twenty-two pitches. In some embodiments, the total key set is configured to produce twelve pitches from the twelve octave keys, five pitches from the five additional keys, and five pitches from a simultaneous press of an octave key and an additional key. In some embodiments, the simultaneous press is a press of an octave key and an adjacent additional key.

In some embodiments, the five additional keys are configured to produce microtones. In some embodiments, the five pitches produced from the simultaneous press are microtonal pitches. In some embodiments, from 10-22 of the twenty two pitches are configured to be microtones.

In some embodiments, the body of the digital keyboard instrument comprises wood. In some embodiments, the body comprises plastic. In some embodiments, the digital keyboard instrument comprises one total key set. In some embodiments, the digital keyboard instrument comprises more than one total key set.

In some embodiments, the digital keyboard instrument is portable. In some embodiments, the digital keyboard instrument further comprises a MIDI controller to alter the volume or sustain of a note.

Another aspect of this disclosure provides a method of manufacturing a digital keyboard instrument comprising a plurality of sharp and flat keys configured to produce microtonal notes. The method comprises the steps of: providing a keyboard body, a processing unit within the body and comprising one or more microcontrollers operably connected to the processing unit, a speaker, and a power supply; providing lightweight keys representing a plurality of octaves comprising seventeen total keys per octave, wherein the seventeen total keys comprise twelve octave keys and five additional keys, wherein each additional key is a split sharp key or a split flat key; arranging each harpsichord key to operably connect to a microcontroller; configuring the five additional keys to produce microtones; and providing digital sampling for each of the seventeen keys per octave for a specified sound.

In some embodiments, the method further comprises configuring the five additional keys to produce microtones. In some embodiments, the method comprises configuring the total key set so that a simultaneous press of an octave key and an additional key produces a microtone. In some embodiments, the method further comprises the step of using brass springs and pogo pins to control the volume and sustain of a note emitted from the digital keyboard instrument. In some embodiments, the method further comprises using a MIDI controller to control the volume and sustain of a note emitted from the digital keyboard instrument.

In another aspect, this disclosure provides a digital keyboard instrument comprising: a body; a power supply; one or more processing units arranged within the body; a speaker arranged in the body, configured to emit music, and operably connected to the processing unit; a memory module; one or more microcontrollers operably connected to the processing units and configured to send musical signals to a computer when a key is actuated; and a plurality of total key sets, each total key set comprising: seventeen total keys per octave, wherein the seventeen total keys comprise twelve octave keys and five additional keys. In some embodiments, the processing units are printed circuit boards. In some embodiments, the weight, design, and feel of the keys correspond to, or a similar to, lightweight harpsichord keys.

In some embodiments, the seventeen total keys are configured to produce a total of twenty-two pitches from the twelve octave keys, the five additional keys, and five combination pitches that result from simultaneously depressing an additional key and an octave key. In some embodiments, the processing units are printed circuit boards. In some embodiments, the weight, design, and feel of the keys correspond to, or a similar to, lightweight harpsichord keys.

In a further aspect, this disclosure provides a method of manufacturing a digital keyboard instrument, wherein the digital keyboard instrument comprises octave keys and additional keys, wherein the additional keys are split sharp and flat keys. The method comprises the steps of producing lightweight harpsichord keys representing a plurality of octaves comprising seventeen total keys per octave, wherein the seventeen total keys are configured to produce the twenty-two pitches from the twelve keys from a twelve key octave, five additional keys, and five combination pitches that are produced from a simultaneous press of an octave key and an additional key; splitting each sharp and flat key to create more microtonal options; and, optionally, providing digital sampling for each of the seventeen keys per octave for a specified sound.

DETAILED DESCRIPTION

This disclosure provides a digital keyboard instrument configured to allow a user to easily access microtonal notes in a digital device. As used herein, the terms "a" and "an" can mean one or more than one. Digital keyboard instruments of this disclosure comprise multiple components. The digital keyboard instrument of this disclosure comprises one or more microcontrollers operably connected to one or more processing units configured to send musical signals to a computer when a key is actuated. In some embodiments, a processing unit is a printed circuit board. In some embodiments, a microcontroller is a chip on a circuit board. In some embodiments, when a key of the digital keyboard instrument is pressed, the key actuates a microcontroller which is configured to send a music signal to a computer. In some embodiments, the computer is external to the digital keyboard instrument. In some embodiments, the computer is integrated into the digital keyboard instrument.

Figure 1:
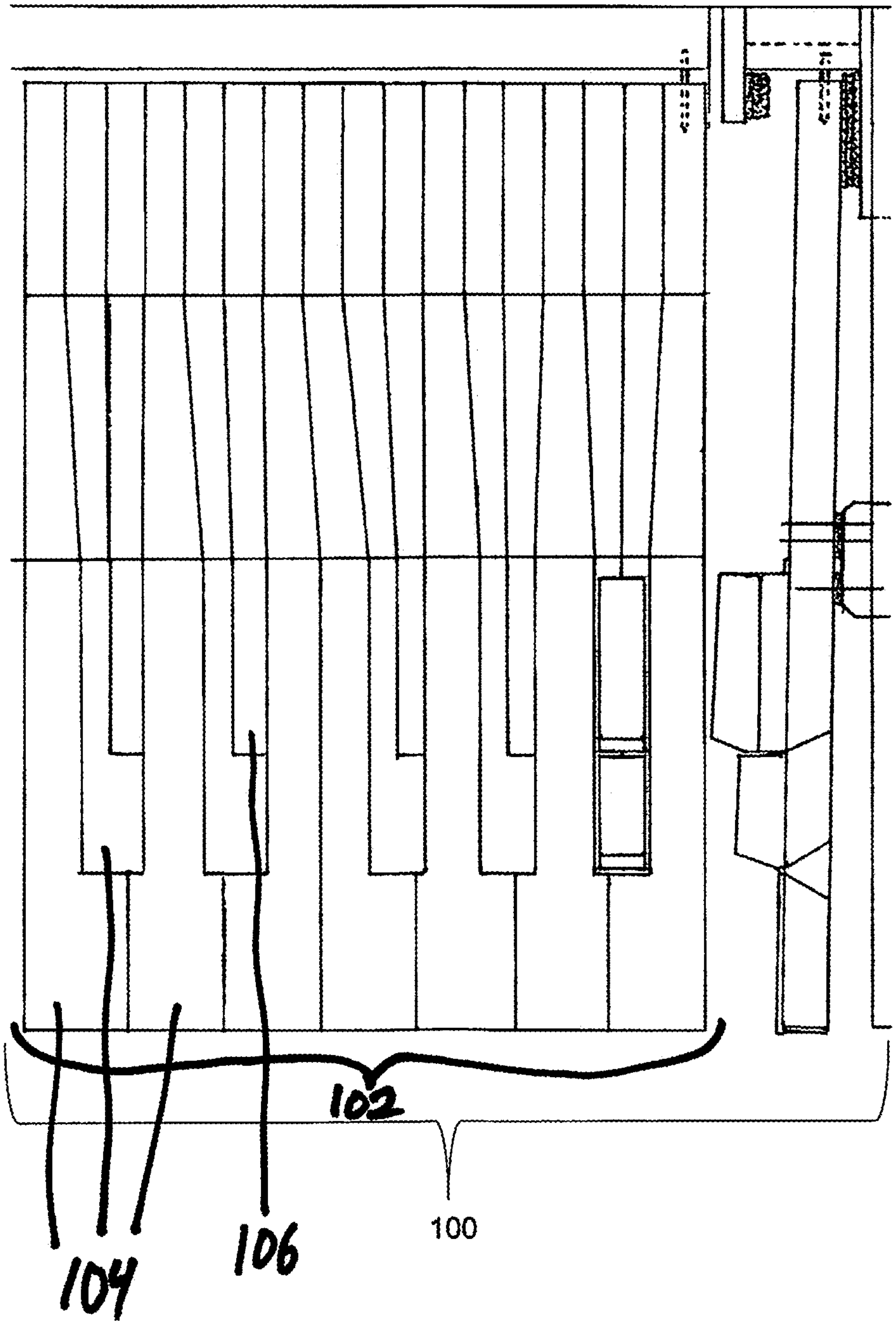
FIG. 1 is a drawing of one embodiment of the digital keyboard instrument.

One embodiment of this digital keyboard is provided in FIG. 1. Digital keyboard instrument 100 is configured in a comfortable arrangement to allow practical fingering and playing. In some embodiments, the digital keyboard instrument 100 includes plurality of keys 102 comprising an octave having seventeen total keys, also referred to herein as the "total key set" or the "total key set per octave." In some embodiments, the seventeen total keys comprise twelve octave keys 104 plus five additional keys 106. As used herein, "additional keys" are also referred to as "split keys." This novel design of 17 keys per octave allows for practical fingering and playing. In some embodiments, the seventeen total keys are configured to produce twenty-two pitches from the twelve octave keys, the five additional keys, and five combination pitches created by the simultaneous depression of an octave key and an adjacent additional key. In some embodiments, the five pitches produced by the five additional keys are microtonal. In some embodiments, the five pitches produced by the simultaneous depression of an octave key and an adjacent additional key are microtonal. In some embodiments, because the keyboard instrument is digital, any number of the twenty two notes can be configured to be microtonal.

In some embodiments, a key of the total key set comprises a lightweight harpsichord key. In some embodiments, the five additional keys are each split flat or a split sharp key. In some embodiments, the digital keyboard instrument comprises a plurality of seventeen total-key octaves. In other embodiments, the digital keyboard instrument has 2, 3, 4, 5, 6, 7, or 8 seventeen total-key octaves. In some embodiments, the digital keyboard instrument comprises a combination of one or more twelve-key octaves and one or more seventeen total-key octaves.

In some embodiments, the digital keyboard instrument 100 is made from plastic. In other embodiments, the digital keyboard instrument 100 is made from wood. In some embodiments, the digital keyboard instrument has a size and shape allowing it to be portable. In other embodiments, the digital keyboard instrument has a larger size and shape.

In some embodiments, the digital keyboard instrument 100 comprises a power supply. In some embodiments, the digital keyboard instrument is powered by alternating current. In such embodiments, the digital keyboard can be plugged into an outlet using an AC adapter. In other embodiments, the digital keyboard instrument includes a battery for powering the keyboard. The battery, in some embodiments, is rechargeable. In other embodiments, the battery comprises an opening for holding and receiving more than one disposable batteries. In some embodiments, the power supply is operably connected to the processing unit and the speaker. In some embodiments, the power supply is also operably connected to an amplifier.

In some embodiments, the keys of the digital keyboard instrument 100 make contact with a switch or two switches that are configured to trigger electronic circuits to generate sound. In such a configuration, when a user depresses a key on the keyboard, the key turns on a switch and a circuit is activated to generate sound. When the user releases the key, the switch is turned off and the sound ceases. In other embodiments, the keys of the digital keyboard instrument 100 make contact with other types of sensors that are configured to trigger electronic circuits to generate sound. In some embodiments, force sensitive sensors are used. In such a configuration, when a user depresses a key on the keyboard, the key causes a tangent to touch a sensor which activates a circuit to generate sound. In some embodiments, the digital keyboard instrument connects to a computer to generate sound.

Further, because the keyboard instrument disclosed herein is digital, in some embodiments, sampling technology is used to make a variety of sounds capable of digital reproduction. For example, the digital keyboard instrument may emit harpsichord, piano, electric piano, organ, guitar, bass, horns, winds, brass, analog synthesizer, theremin, and any other kind of sounds available on digital instruments, or combinations thereof. Some embodiments provide split key instruments that split several sharps and/or flats into two keys and enable the performer to be able to play microtonal notes on a keyboard instrument.

The digital keyboard instruments comprises a body. In some embodiments, the digital keyboard instrument comprises a user interface configured to facilitate selection of sound programs and digital effects. In certain embodiments, the digital keyboard instrument comprises a display screen on the body. In certain embodiments, the display screen is configured to display a user interface. In some embodiments, the user interface allows a user to select a digital sound program such as harpsichord, piano, electric piano, organ, guitar, bass, horns, winds, brass, analog synthesizer, theremin, and any other kind of sounds available on digital instruments, or combinations thereof. In some embodiments, the sound program is stored on a memory module. In some embodiments, the digital instrument further comprises volume control buttons, line-out audio connections, a headphone output jack, or combinations thereof. In some embodiments, the digital keyboard instrument includes a USB connection for MIDI information.

The digital keyboard instrument's body may be constructed out of wood entirely. Alternatively, the digital keyboard instrument's body may be constructed out of any other material that is sufficient to provide support to the various components of the digital keyboard instrument 100 or 200 such as plastic or metal or combinations of plastic, metal, and wood.

In some embodiments, digital keyboard instrument 100 comprises MIDI controllers comprising two buttons (connected to printed circuit boards) underneath each key configured to make the MIDI keyboard sensitive to velocity. The MIDI controllers are tactile momentary push buttons but are positioned in a staggered pattern so that one MIDI controller is pushed into the "on" position slightly before the other MIDI controller. By timing the difference between when each MIDI controller is activated, the velocity can be calculated and used by MIDI software stored on memory on the digital keyboard instrument 100 to alter the volume and sustain of a note. Another embodiment may comprise using brass springs placed above the key ends which push pogo pins (instead of push buttons) also connected to printed circuit boards. Yet another embodiment may use force sensitive sensors connected to printed circuit boards where tangents are configured to make contact with sensors.

Figure 2:
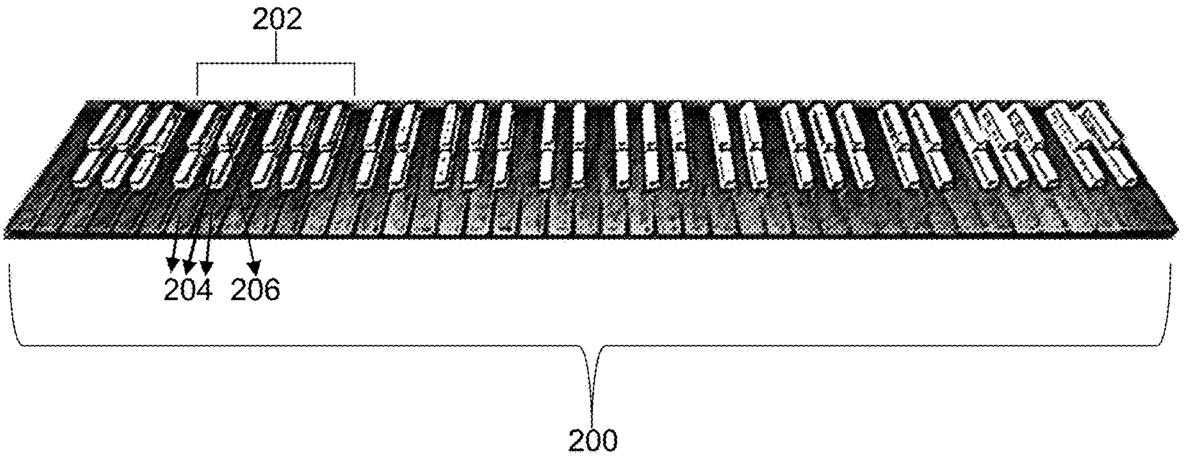
FIG. 2 is a drawing of another embodiment of the digital keyboard instrument.

Now referring to FIG. 2, digital keyboard instrument 200 represents an embodiment comprising 17 keys per octave. The variations of digital keyboard instrument 100 described above also apply to digital keyboard instrument 200. The sharps and flats are split which provides a musician a practical and comfortable way to perform a variety of different types of microtonal musics. Digital keyboard instrument 200 has 6 octaves of 17 keys plus 1 more key which results in a total of 103 keys (17×6+1=103).

Digital keyboard instrument 200 provides more microtonal notes via additional keys 202. In achieving this access to more microtonal notes, by adding five additional keys to the twelve key octave by splitting the sharps/flats, the digital keyboard instrument provides access to more microtonal notes via additional keys 202 without altering the layout of the keyboard in a way that would make it impractical to play and without creating uncomfortable fingerings. Furthermore, this disclosure provides a digital keyboard which allows a user to switch from one tuning preset to another instantaneously, allowing quick transitions during musical performances.

Furthermore, another embodiment of the digital keyboard of this disclosure utilizes weightless keys that would be smaller than those found on a piano. For example, in some embodiments the weightless keys are harpsicord keys. Weightless keys facilitate easier access to the back of additional keys 202 by implementing a practical fingering. In other embodiments, the digital keyboard instrument comprises velocity-sensitive keys. In some embodiments, the keys are semi-weighted.

EQUIVALENTS

It is to be understood that the foregoing description is intended to illustrate and not limit the scope of the invention, which is defined by the scope of the appended claims. Those skilled in the art will recognize, or be able to ascertain, using no more than routine experimentation, numerous equivalents to the specific embodiments described specifically in this disclosure. Such equivalents, and other aspects, advantages, and modifications, are within the scope of the following claims.

The invention claimed is:

1. A digital keyboard instrument comprising:
a body;
a processing unit arranged within the body and comprising a plurality of microcontrollers; and
one or more total key sets, wherein each total key set comprises:
seventeen total keys per octave, wherein the seventeen total keys comprise twelve octave keys and five additional keys,
wherein each of the five additional keys is a split flat key or split sharp key,
wherein each microcontroller is configured to send a musical signal to a computer when actuated by a key.

2. The digital keyboard instrument of claim 1, wherein the total key set is configured to produce twenty-two pitches.

3. The digital keyboard instrument of claim 2, wherein the total key set is configured to produce twelve pitches from the twelve octave keys, five pitches from the five additional keys, and five pitches from a simultaneous press of an octave key and an additional key.

4. The digital keyboard instrument of claim 3, wherein the simultaneous press comprises a press of an octave key and an adjacent additional key.

5. The digital keyboard instrument of claim 3, wherein the five additional keys are configured to produce microtones.

6. The digital keyboard instrument of claim 2, wherein 10-22 of the twenty two pitches are configured to be microtones.

7. The digital keyboard instrument of claim 1, wherein the body comprises wood.

8. The digital keyboard instrument of claim 1, wherein the digital keyboard instrument comprises one total key set.

9. The digital keyboard instrument of claim 1, wherein the digital keyboard instrument comprises more than one total key set.

10. The digital keyboard instrument of claim 1, wherein the digital keyboard instrument is portable.

11. The digital keyboard instrument of claim 1, wherein the body comprises plastic.

12. The digital keyboard instrument of claim 1, further comprising a MIDI controller configured to alter the volume or sustain of a note.

13. A method of manufacturing a digital keyboard instrument comprising a plurality of sharp and flat keys configured to produce microtonal notes, the method comprising the steps of:
providing a keyboard body, a processing unit within the body and comprising a plurality of microcontrollers operably connected to the processing unit, a speaker, and a power supply;
providing lightweight harpsichord keys representing a plurality of octaves comprising seventeen total keys per octave, wherein the seventeen total keys comprise twelve octave keys and five additional keys, wherein each additional key is a split sharp key or a split flat key;
arranging each harpsichord key to operably connect to a microcontroller;
configuring the five additional keys to produce microtones;
providing digital sampling for each of the seventeen keys per octave for a specified sound.

14. The method of claim 13, further comprising configuring the five additional keys to produce microtones.

15. The method of claim 13, further comprising configuring the total key set so that a simultaneous press of an octave key and an additional key produces a microtone.

16. The method of claim 13, further comprising the step of using brass springs and pogo pins to control the volume and sustain of a note emitted from the digital keyboard instrument.

17. The method of claim 13, further comprising using MIDI controllers to control the volume and sustain of a note emitted from the digital keyboard instrument.

* * * * *